United States Patent [19]

Dardick

[11] Patent Number: 4,474,250

[45] Date of Patent: Oct. 2, 1984

[54] MEASURING WHILE DRILLING

[76] Inventor: David Dardick, 211 E. 70th St., New York, N.Y. 10021

[21] Appl. No.: 399,097

[22] Filed: Jul. 16, 1982

[51] Int. Cl.³ .................... E21B 47/024; E21B 49/04
[52] U.S. Cl. .......................... 175/1; 175/4.5; 175/45; 175/50
[58] Field of Search .............. 175/1, 4.5, 4.57, 40, 175/45, 50, 65

[56] References Cited

U.S. PATENT DOCUMENTS

| | | | |
|---|---|---|---|
| 2,062,151 | 11/1936 | Weatherby | 175/1 X |
| 2,179,832 | 11/1939 | Smith | 175/45 |
| 2,452,515 | 10/1948 | Athy | 175/50 X |
| 3,520,375 | 7/1970 | Raynal et al. | 175/50 X |
| 3,828,867 | 8/1974 | Elwood | 175/45 |
| 3,979,140 | 9/1976 | Silverman et al. | 175/45 X |
| 3,979,724 | 9/1976 | Silverman et al. | 175/40 X |
| 4,004,642 | 1/1977 | Dardick | 175/93 X |
| 4,026,382 | 5/1977 | Field et al. | 175/50 X |
| 4,038,631 | 7/1977 | Murphy | 175/50 X |

Primary Examiner—George A. Suchfield
Attorney, Agent, or Firm—Alfred B. Levine

[57] ABSTRACT

A method of measuring lithology, and other underground conditions, while drilling bores into the earth employing the repetitive firing of projectiles to fracture rock and penetrate the earth and detecting the high intensity acoustic signals being produced as the drill progressively penetrates.

10 Claims, 14 Drawing Figures

WEAK, POROUS ROCK

HARD, DENSE ROCK

BRITTLE ROCK

PLASTIC ROCK

MEASURING WHILE DRILLING

STATEMENT OF THE INVENTION

This invention generally relates to improved methods and apparatus for earth drilling, and more particularly to such improvements for continually measuring conditions of the drilling bit and of the bore hole during the drilling process.

BACKGROUND OF THE INVENTION

Continuing effort is being employed to provide continuous measurement while drilling ("MWD") of the earth to improve the safety, efficiency, and economy of drilling. The drilling of deep oil wells, often to depths of 2 to 4 miles below the surface, generally requires long time periods of from 3 to 6 months because of the many time consuming problems that often arise while drilling. Since deep drilling land rigs presently cost from $5,000 to $25,000 each day; and floating offshore rigs cost from $25,000 to $100,000 each day, the need for minimizing or avoiding many difficulties and shortening the drilling time is evident.

The extensive time and great expense of drilling can be significantly reduced and many problems avoided if the driller is able to continually monitor conditions at the drill bit and at the hole bottom as the drilling progresses. Having such information, the driller can improve the efficiency of the drilling; monitor the direction of the drilling and location of the drill bit; monitor the bottom hole temperatures and pressures to avoid blowouts; and obtain the lithology and other characteristics of the well formations in which the drill bit is operating.

At present a number of methods and apparatus have been used, or attempted, in an effort to satisfy this important need.

MUD PULSE SYSTEM

In this system, conventional pressurized drilling mud is pumped downhole into the drill pipe from the surface and forced downwardly toward the drill bit. This flow of mud is periodically interrupted and resumed by a pulsing valve and control mechanism located near the drill bit to modulate the pressurized flow of mud. A pressurized signal pulse results that travels upwardly through the mud to the surface where it is detected and analyzed to obtain the transmitted information. Although this system eleminates the need for special types of drill pipe, or of cable for transmitting the signal, the data rate for transmission of a signal is low, since the low frequency pressure pulse travels at a rate of only 4000 to 5000 feet per second. The signal is also comparatively weak and difficult to detect and separate from the noisy drilling environment. Additionally, the pulsing valve and modulator mechanism is located downhole near the drill bit and requires power to be operated from that downhole location in the well.

ELECTROMAGNETIC SYSTEM

In this type of system, an electromagnetic transmitter is provided downhole in the drill pipe near the drill bit and transmits electromagnetic wave signals through the drill pipe and earth to be received and processed by receivers located at the surface of the earth. The background noise during the drilling operations often makes the transmitted signals from the transmitter difficult to detect at the surface. Attenuation of these electromagnetic signals also occurs where the drilling is being conducted in high conductivety environments, such as in metallic ores. To enhance the weakened signals, repeater-amplifiers are often used at spaced distances along the drill pipe string. These amplifiers considerably add to the cost of the system and create additional reliability problems in this harsh environment.

WIRELINE SYSTEMS

In this type of system, a transmitter located downhole in the drill string is electrically wired by cables and rotary connectors to receivers at the surface. An electrically wired system of this kind is often used for purposes of logging and other borehole operations after the hole has already been drilled. However, when using such a wired system during a drilling operation using a rotary drill, difficulties are usually experienced in maintaining the integrity of the cables, and with the rotary electrical connectors. Consequently such electrically wired systems are expensive and difficult to use and are not as reliable as desired. The advantages, however, are that such wired systems enable a high data rate for transmission of information; permit two way communication from the surface to the bottom of the borehole during drilling; and permit the electrical power to be applied from the surface.

ACOUSTIC TRANSMISSION SYSTEMS

In the acoustic systems, similar to electromagnetic transmission, an acoustic or sonic signal transmitter is located downhole in the drill pipe near the drill bit and transmits its signals upwardly to receivers located at the surface. Like the electromagnetic pulses, the low intensity acoustic signals are attenuated and are interferred with by noises produced by the drill rig, pipes, and drill and are further reflected and refracted by tool joints and other objects; all combining to make the sonic signals difficult to detect at the surface. A series of repeater-amplifiers located at spaced distances along the drill pipe are also usually required to enhance the weak signals.

SUMMARY OF THE INVENTION

According to the present invention there is provided a measuring while drilling "MWD" system and method that preferably employs a terradynamic earth drill of the present inventor, earlier U.S. Pat. No. 4,004,642, that drills into the earth by repetitively firing projectiles to fracture and break rock in combination with a rotary drill bit mechanism. In a preferred method and apparatus the drill fires salvos of projectiles in a time delayed fashion to fracture and break the rock by a process of shock wave stress interaction, and the rotary drill pulverizes the rock and permits its withdrawal.

The high energy impact of the salvos of projectiles against the rocks, in the order of 20,000 ft. lbs, produces very high energy acoustic pulses, that are several orders of magnitude greater than the noise usually produced by conventional drill bits, thereby providing easily detectable high energy acoustic wave signals. The receivers for the acoustic pulses are located on the earth's surface, and receive the transmitted waves produced by the impacting projectiles against the rock to enable the desired information concerning the drill and the conditions of the bore hole to be continually determined. Since the projectiles are filed in a repetitive fashion during the drilling process as the bore hole is drilled to different depths, the high intensity acoustic signals that are generated at the different depths provide for continually monitoring the desired conditions by more easily detectable high intensity acoustic signals that are far greater in amplitude that the extraneous ambient noises being developed.

According to additional features of the invention, transducers may be also provided downhole near the drill bit to detect other conditions in the borehole such as the influx of gas entering the drill mud to create a blowout, and others.

In a preferred embodiment, the firing of the downhole drill may be triggered from the surface to control the rate of drilling and correspondingly the rate of producing the detectable sonic pulses.

DETAILED DESCRIPTION OF PREFERRED EMBODIMENTS

Figure 1:
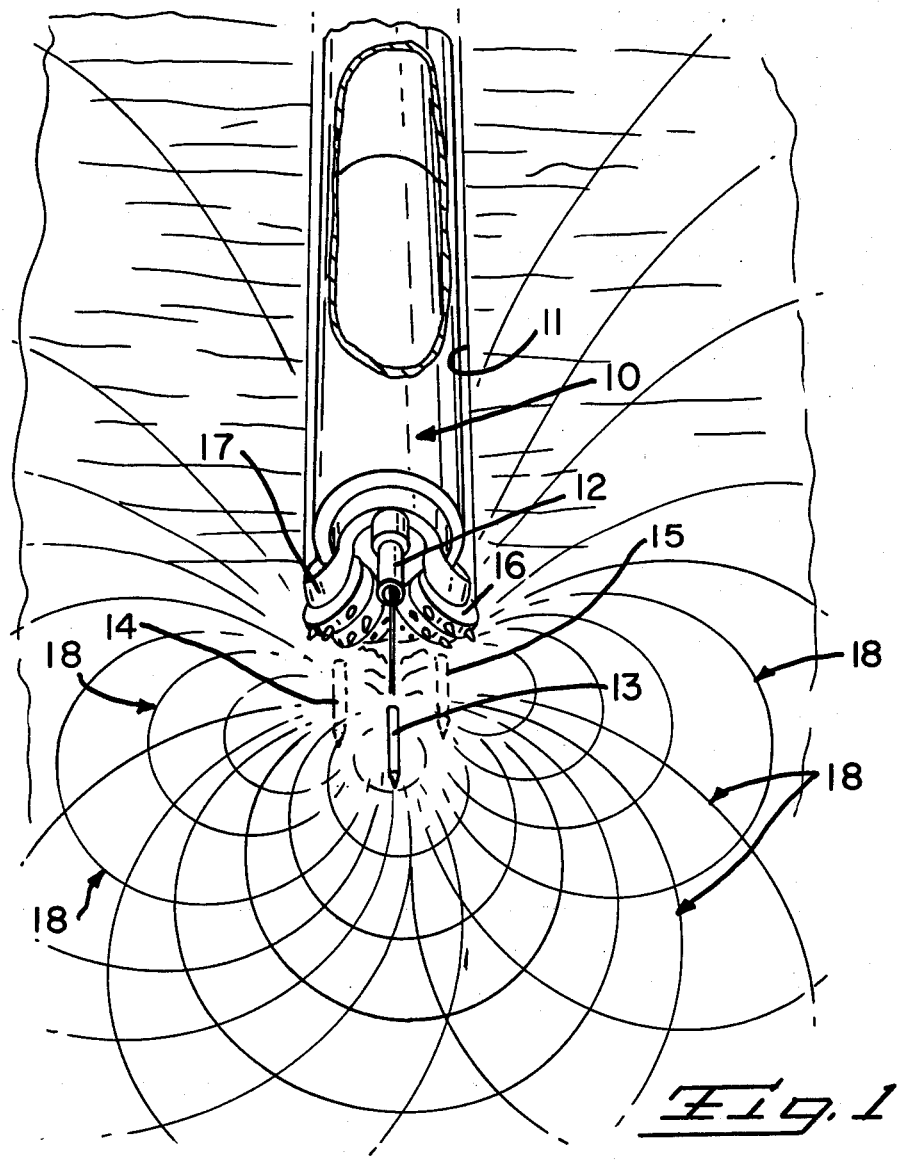
FIG. 1 is an illustration, partly in perspective and partly cut away, showing the portion of the drill located downhole in the bore.

FIG. 1 generally illustrates a projectile firing drill 10, as is more fully disclosed in Applicants' earlier U.S. Pat. No. 4,004,642, during the process of drilling into the earth and processively forming its borehole 11 as it is lowered into the earth during the drilling process. As generally shown in FIG. 1, the drill head 19 employs a series of displaced barrels, such as 12, for firing a salvo of projectiles 13,14 and 15 into the earth and rock, that serves to crack and break the rock. The drill head 10 also includes a series of conventional rotary drill bits such as 16 and 17 that serve to comminute or pulverize the cracked and broken rock and earth, permitting the comminuted materials to be removed and the drill to be progressively lowered to form the borehole 11. As is conventional in the deep well drilling arts, the comminuted earth materials are generally removed from the borehole by a pressurized and circulated drilling fluid, such as drill mud or by compressed air, that is injected into the drill pipe string from the surface and conveyed by the drill string down into the bottom of the bore through orifices in the drill head 10. This pressurized mud or other fluid forces the pulverized rock and debris back upwardly through the bore 11 to the surface where it is removed, and the pressurized mud or other fluid is recirculated back into the borehole to continue this removal process.

According to the present invention, the "MWD" measuring while drilling process is performed continually as the drill 10 progressively bores 11 into the earth; with each firing of the projectiles 13, 14 and 15 into the rock as the drilling progresses. As the gun 12 and others fire each salvo of projectiles against the rock, a very strong sonic or acoustic signal of about 27,000 joules, is generated at the base or bottom of the borehole and a sonic wave 18 travels through the earth and drill pipe to the surface, as shown. These high intensity radiated sonic waves 18 passing upwardly to the surface are detected by conventional acoustic or sonic detectors at the surface as best shown in FIGS. 3, 4, and 5.

Figure 3:
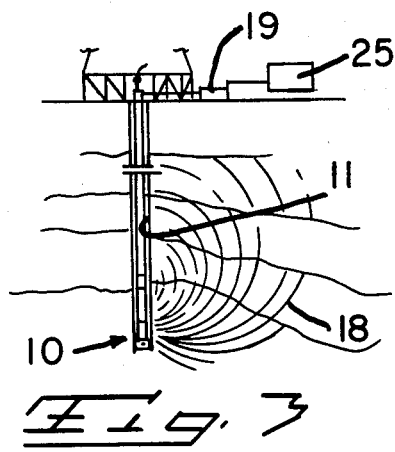
FIGS. 3 and 4 are cross sectional views, showing the entire drill rig, drill pipe string, and drill bit during borehole operations and the receivers, recorders, and processors at the surface for measurement.

Referring to FIG. 3, the drill 10 and drill string is shown as located deep into a borehole 11 in the earth, and each succeeding firing of the projectiles therein at different depths produces very strong sonic waves 18 that travel upwardly through the earth and are detected by receivers 19 at the surface. These high intensity pulsed waveforms are recorded and applied to a data processor and display system 25 as is now conventional in this art.

Figure 4:
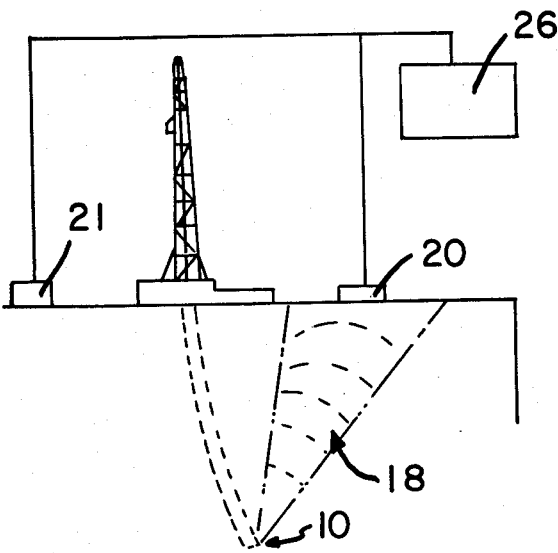
Figure 5:
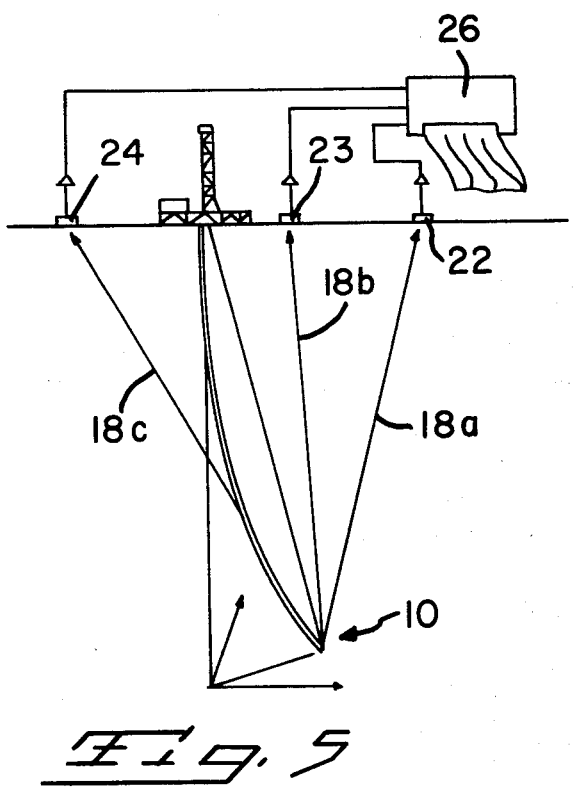
FIG. 5 is a cross sectional view showing plural receivers at the surface for continually determining the downhole location of the drill by triangulation.

As shown in FIG. 4, a series of displaced detectors or transducers 20 and 21 may be employed at the surface to each receive the sonic signals 18 produced by the impacting projectiles 13,14 and 15 at displaced locations after each firing, to enable additional information to be obtained, as will be more fully discussed in connection with FIG. 5, showing triangulation of these signals to monitor the location of the drill.

Figure 2A:
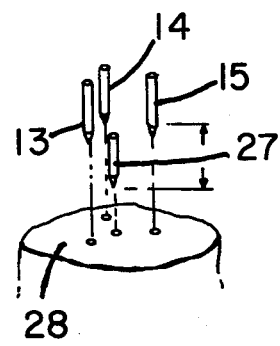
FIGS. 2a, 2b, and 2c are three time lapse views, in perspective, illustrating a salvo of time delayed projectiles successively penetrating and cracking rock.
Figure 2B:
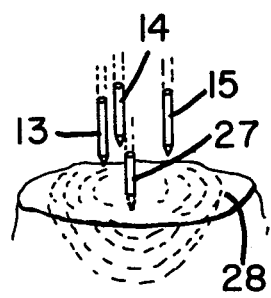
Figure 2C:
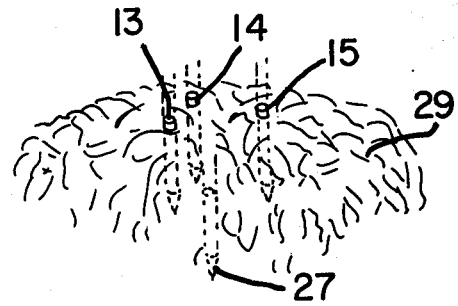

FIGS. 2a, 2b, and 2c more graphically illustrate the process of cracking and breaking the rock 28, and generating the very high intensity sonic signals 18 that have been described. As shown in FIG. 2a, a salvo of more than two projectiles 13, 14, 15, and 27 are produced during each firing, with the projectiles being fired in a particular time delayed fashion as shown. As shown in FIG. 2b, the first fired projectile 27 strikes before the others, creating a traveling shock wave within the rock 28. The subsequent striking and penetration of the rock 28 by the other projectiles 13, 14, and 15 at different locations and at predetermined time delays, produces an interaction and amplification of the shock pattern, termed by the inventor as "shock wave stress interaction" that results in greater fracture and breaking of the rock. The great energies required to crack and fracture the rock (particularly hard rocks), result in the very high intensity sonic waves 18 that are produced, as described above. The intensity of those waves 18 is far greater than the sonic noises generated during the drilling, such as the rotation of the drill string, the pumping of the mud or other fluid, and the grinding of the fractured rock by the rotary drill bits 16 and 17. Accordingly these high intensity sonic waves 18 through the earth are easily detected by sonic transducers such as 19,20 or 21 at the surface, as shown in FIGS. 3 and 4.

Since these sonic pulses are repetitively produced with each firing of the projectiles as the drill 10 progressively penetrates the earth, the receivers 19,20, and 21 at the surface detect a continuing sequence of these signals from the different depths as the drill progresses downward. This continual sequence of signals is recorded at 26 and enables the sonic velocity of the waves through the various strata or formations above the borehole to be continually logged during the continuous drilling process.

BIT LOCATION

Since many deep oil wells are drilled to depths of 2 to 4 miles below the surface, it is often difficult to monitor conditions at the drill bit and to continuously determine the location of the drill and pipe referenced to the location of the drilling rig at the surface. Since approximately 15% of drilling time is expended in surveying the hole in directional wells, the time and expense in monitoring the location of the drill and the direction of the borehole is normally very expensive. According to the present invention, this is performed by triangulation of the bit location using the high intensity sonic pulses 18, as shown in FIGS. 4 and 5. Referring to FIG. 4, a series of two displaced receivers 20 and 21 at the surface enables the two axis location of the drill bit to be continually monitored (X and Y); and in FIG. 5 a series of three or more diplaced detectors 22,23, and 24 permits three axis (X,Y, and Z) detection of the drill head location. Continual monitoring and recording of the position at each range of depth also enables the spatial path of the borehole or well path to be determined and recorded from the surface to the bottom of the borehole. Triangulation processes and underground surveying techniques are well known and a further description is not considered necessary in this application.

FORMATION EVALUATION

Figure 8:
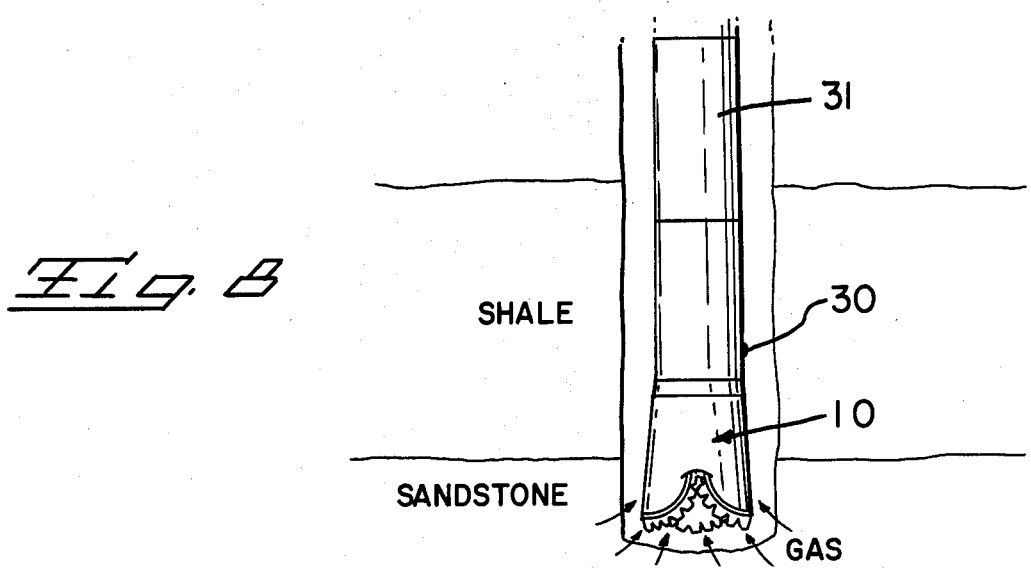
FIG. 8 is a partial cross sectional illustration of a modified drill having an acoustic detector and signal processor located in the drill pipe near the drill head.

FIG. 8 discloses a modification of the drill to include an acoustic detector, or pick-up 30 at a downhole location in the drill string near the drill bit 10 to receive the acoustic waveforms and sounds produced at the location of the drill bit. Additionally located near the detector 30 is a suitable signal processor system 31 to receive and process these sound signals and direct them to the surface for recording and further processing.

It has been found that the nature of the sound or waveforms produced upon impact of the projectiles with rock varies with the type of rock. For example, the sound produced upon impact with hard rocks that shatter (sandstone, limestone, and dolomite) differs from that produced by "plastic" rock (such as shale or mudstone). Thus the nearby detector 30 and processor 31 receive and analyze those acoustic signals to obtain a lithologic log of the rock strata at the different depth locations. Since the intensity of impact of the projectiles with the rock is so much greater than the sound produced during conventional drilling of the rock, the system and method of the present invention is more accurate and precise than that of others, and requires less complex and costly detectors 30 and signal processors 31.

BLOWOUT PREVENTION

Oil blowouts occur when the pressure of gas orginating from the earth formation exceeds the mud pressure, or other fluid pressure in the wellbore, permitting the earth gases to flow into the well and up the wellbore to the surface. Upon reaching the surface, the pressurized earth gases expand and ignite to burn the rig and often injure the workers. It is generally difficult to detect the early influx of such earth gases into the well until a considerable quantity of gas has already entered the well, and consequently it is difficult to prevent many blowouts. According to the present invention this early detection is performed by listening to the waveform of sound of the fired projectiles while traveling through the drilling mud to determine any changing properties of the mud. As gas flows from the earth formation into the drilling mud, the influx of the gas changes the waveform of sound produced by the fired projectiles passing through the mud. These sounds are detected by the downhole detector 30 in FIG. 8 and applied to the downhole signal processor 31 where it is determined from the changes in the waveform that an influx of gas has occured. Corrective action can therefore be taken at a much earlier time than before, and the drillers receive an earlier warning than before of the possibility of blowout.

OTHER ROCK PROPERTIES

Figure 7A:
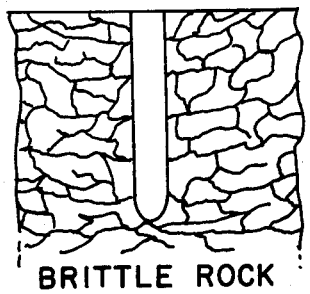
Figure 7B:
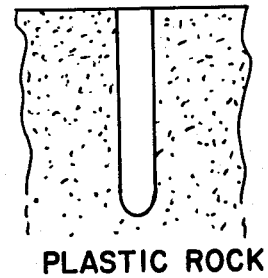

According to the present invention, the projectiles are fired in a time spaced repetative manner, as needed, to fracture and break the rock, and the drill pipe and drill pit are concurrently continuously rotated to pulverize the cracked and broken rock, and permit its withdrawal from the borehole by the use of pressurized mud or by compressed air. The degree of fracturing produced by the fired projectiles is greater in brittle rock, (such as sandstone and limestone) as shown in FIG. 7a, than in "plastic" rock (such as shale) as shown in FIG. 7b.

Figure 9:
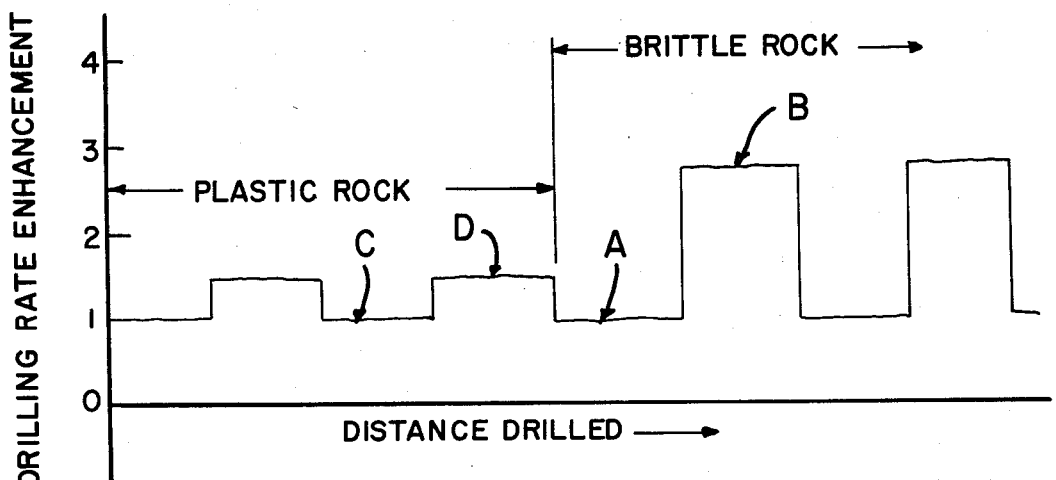
FIGS. 9 and 10 are charts showing the drilling rate enhancement "DRE" when drilling through different types of rock.

Thus the difference in the drilling rate through "hard" rock using the fired projectiles as compared to the rate without firing (e.g. drilling rate enhancement) is much greater in brittle rock then in soft, porous rock as is shown in FIG. 9. Referring to FIG. 9, and assuming that the rate of drilling brittle rock without firing to be at level 1, labeled "A", it is seen that the drilling rate increases to level 4, labeled "B", almost four times greater, when projectiles are fired to break up the rock. On the other hand when drilling plastic rock without firing at a rate of level 1, labeled "C" in FIG. 9, the rate of drilling increases to only level 2, labeled "D" in FIG. 9 when the projectiles are fired, since the "Plastic" rock is not shattered or broken up to the same extent, (as shown in FIG. 7b).

Figure 6A:
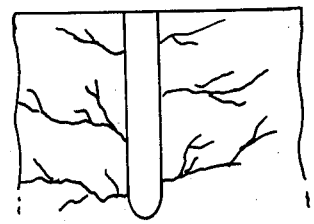
FIGS. 6a, 6b, 7a, and 7b are illustrative views, comparing the degree of penetration and cracking of different types of rock by the projectiles.
Figure 6B:
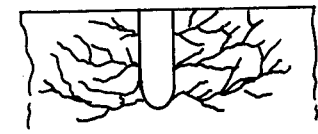
Figure 10:
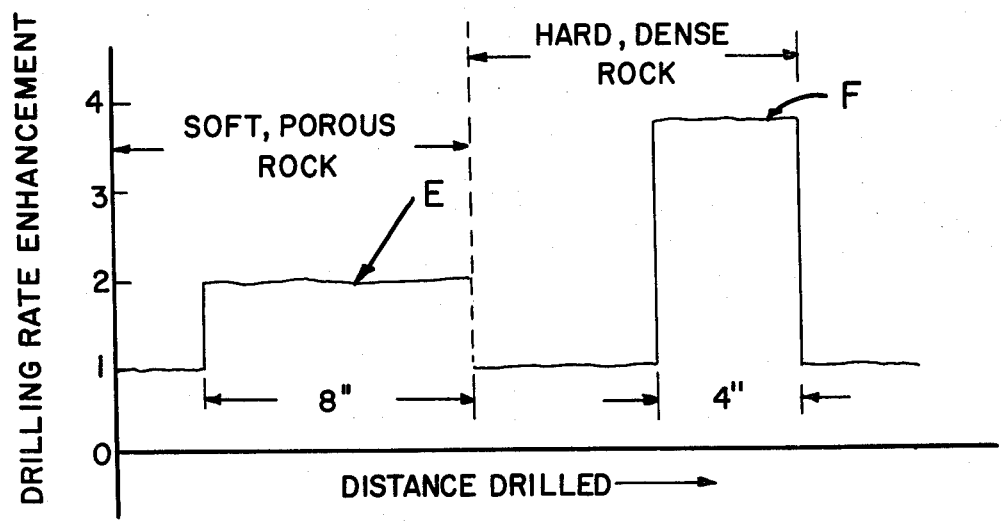

However, conversely the fired projectiles penetrate further into the softer, or porous rock as shown in FIG. 6a than in harder, dense rock as shown in FIG. 6b. Therefore, the distance advanced by the drill is greater with the firing in the softer rock as shown by region F in FIG. 10.

Thus by measuring the rate of advance of the drill and drill pipe with and without firing, the ratio of change of rate of advance of the drill is detectably greater in hard rock. But the ratio of distance traveled by the drill with and without firing is greater in softer, porous rock than in the harder rock. Accordingly the rate of advance during firing intervals, and the distance traveled by the drill during such intervals are both continuously monitored and are employed to log the lithology of the boreholes being drilled. The considerable advantage of this measurement of logging lithology is that it required no downhole instruments but merely uses surface based monitors for monitoring, recording, and processing the data obtained from the ratio of rate of drill pipe advance, and the ratio of distance advanced by the drill and pipe with and without firing.

What is claimed is:

1. A method of continually measuring conditions of lithology and of drilling during the process of drilling the earth comprising the steps of:

firing projectiles into the earth at different depths to both fracture and break rock for drilling and for generating strong sonic signals upon impacting of the projectiles and rock, and continually detecting and analyzing said sonic signals being produced at the different depths to determine the conditions of drilling and of the lithography of the earth at each depth as the drilling progresses.

2. In the method of claim 1, the additional step of analyzing the waveform of the detected sonic pulses to determine the lithology of the rock.

3. In the method of claim 2, detecting the sonic pulses from a downhole location near the firing of the projectiles for analyzing the waveform.

4. In the method of claim 1, wherein the drilling process includes the use of pressurized drilling mud, the additional step of detecting and analyzing the waveform of the fired projectiles traveling through the drilling mud by a transducer near the drill to determine the properties of the mud and the degree of gas therein.

5. In the method of claim 1, the step of detecting the sonic signals being performed by a sonic signal detector located at the surface of the earth.

6. In the method of claim 1, locating a series sonic signal detectors at spaced apart positions near the earths surface for continually determining by triangulation the location of the drill at each different depth.

7. In the method of claim 1, the additional step of transmitting data from downhole locations during the drilling of the earth, comprising the firing of the projectiles in given time patterns corresponding to the data to be transmitted.

8. In the method of claim 1, the additional step of determining the rate of advance of the drill during the firing of the projectiles to determine the degree of hardness and brittleness of the rock being drilled.

9. In the method of claim 1, the additional step of determining the distance advanced by the drill during firing of the projectiles to determine the hardness of the rock being drilled.

10. In the method of claim 1, the additional step of combined rotary drilling and firing projectiles into the earth and comparing the rate of advance of the drill without firing with the rate of advance with firing to determine the hardness of the rock being drilled.

* * * * *